(12) United States Patent
Kang et al.

(10) Patent No.: US 8,715,611 B2
(45) Date of Patent: May 6, 2014

(54) IRON OXYHYDROXIDES AND METHODS OF SYNTHESIZING THE IRON OXYHYDROXIDES

(75) Inventors: Il-Mo Kang, Seoul (KR); Yun-Goo Song, Seoul (KR); Sung-Ja Choi, Daejeon (KR); Myung-Hun Kim, Seoul (KR); Young-Boo Lee, Jeonju-si (KR); Bui Hoang Bac, Hanoi (VN)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 306 days.

(21) Appl. No.: 13/214,417

(22) Filed: Aug. 22, 2011

(65) Prior Publication Data

US 2012/0315479 A1      Dec. 13, 2012

(30) Foreign Application Priority Data

Jun. 7, 2011   (KR) ........................ 10-2011-0054304

(51) Int. Cl.
*C01G 49/10*       (2006.01)

(52) U.S. Cl.
USPC ............................ 423/463; 423/579; 428/398

(58) Field of Classification Search
None
See application file for complete search history.

(56) References Cited

U.S. PATENT DOCUMENTS

| | | | |
|---|---|---|---|
| 2002/0104599 A1* | 8/2002 | Tillotson et al. | 149/19.92 |
| 2006/0083694 A1* | 4/2006 | Kodas et al. | 424/46 |
| 2007/0178163 A1* | 8/2007 | Kodas et al. | 424/489 |

OTHER PUBLICATIONS

A New Iron Oxyhydroxide Phase: The Molybdate-Substituted Analogue of Akaganeite. William R Richmond et al. Chemical of Materials . Aug. 24, 2004.*
J. E. Post, P. J. Heaney, R. B. Von Dreele and J. C. Hanson, "Neutron and temperature-resolved synchrotron X-ray powder diffraction study of akaganeite", American Mineralogist, 2003, vol. 88, pp. 782-788.

* cited by examiner

*Primary Examiner* — Melvin C Mayes
*Assistant Examiner* — Colette Nguyen
(74) *Attorney, Agent, or Firm* — Kile Park Reed & Houtteman PLLC (57) ABSTRACT

An iron oxyhydroxide includes a plurality of iron oxyhydroxide octahedra components, a plurality of chloride components and at least one of germanium hydroxide components or germanium oxide components. The iron oxyhydroxide octahedra components form a tunnel-type structure. The chloride components are disposed in a tunnel of the tunnel-type structure and bonded to at least one of the iron hydroxide octahedra components. The germanium hydroxide components or the germanium oxide components substitute for at least one of the chloride components.

9 Claims, 7 Drawing Sheets

IRON OXYHYDROXIDES AND METHODS OF SYNTHESIZING THE IRON OXYHYDROXIDES

CROSS-REFERENCE TO RELATED APPLICATIONS

This application claims priority under 35 USC §119 to Korean Patent Application No. 2011-0054304 filed on Jun. 7, 2011, the contents of which are herein incorporated by reference in its entirety.

BACKGROUND OF THE INVENTION

1. Field of the Invention

Example embodiments of the present invention relate to iron oxyhydroxides and methods of synthesizing the iron oxyhydroxides. More particularly, example embodiments of the present invention relate to highly ordered iron oxyhydroxides and methods of synthesizing the iron oxyhydroxides.

2. Description of the Related Art

Recently, various researches on iron oxyhydroxide nanoparticles have been conducted. Particularly, various attempts for employing akaganeite which is one of the iron oxyhydrorxides as a catalyst or an absorbent in nano-technical applications have been made, because a tunnel-type nanoporous structure of the akaganeite has unique absorption properties, ion exchange properties, and catalytic properties.

However, due to its low structural ordering and stability, the akaganeite is easily transformed to the more stable form, $\alpha$-$Fe_2O_3$ (hematite) by dehydration or dehydroxylation. Thus, the akaganeite has been of great research interest as a means of preparing uniform nanocrystalline hematite particles ($\alpha$-$Fe_2O_3$) rather than as the catalyst or the absorbent in industrial applications. In order to use the akaganeite as a unique catalyst for some specified nano-technical applications, it is therefore required to improve the structural ordering and stability of the akaganeite.

SUMMARY OF THE INVENTION

Example embodiments of the present invention provide an iron oxyhydroxide having improved structural ordering and stability.

Example embodiments of the present invention further provide a method of synthesizing the iron oxyhydroxide.

According to one aspect of the present invention, there is provided an iron oxyhydroxide. The iron oxyhydroxide includes a plurality of iron oxyhydroxide octahedra components, a plurality of chloride components and at least one of germanium hydroxide components or germanium oxide components. The iron oxyhydroxide octahedra components may form a tunnel-type structure. The chloride components may be disposed in a tunnel of the tunnel-type structure and bonded to at least one of the iron hydroxide octahedra components. The at least one of the germanium hydroxide components or the germanium oxide components may substitute for at least one of the chloride components.

In example embodiments of the present invention, the iron oxyhydroxide may further include at least one germanium ion substituting for at least one of iron ions in the iron oxyhydroxide octahedra components.

In example embodiments of the iron oxyhydroxide, an atomic ratio of germanium to iron may be in a range of about 0.12 to about 0.20 and an atomic ratio of chloride to the iron may be in a range of about 0.04 to about 0.13. The iron oxyhydroxide may include akaganeite. The akaganeite may have a tunnel-type rod-like shape with a width of about 15 nm to about 17 nm and a length of about 100 nm to about 200 nm.

According to one aspect of the present invention, there is provided a method of synthesizing an iron oxyhydroxide. In the method, germanate is added to a solution of iron chloride hydrate to produce a mixed solution. Then, pH of the mixed solution is increased and then the increased pH of the mixed solution is decreased to precipitate products of the iron chloride hydrate and the germanate.

In example embodiments of the present invention, after decreasing the pH of the mixed solution, the mixed solution having the precipitated products may be stirred to produce a suspension. Then, the suspension may be aged to grow the precipitated products. Ammonia water may be added to the aged suspension to flocculate the grown products.

In an example embodiment, a molar ratio of iron to germanium in the mixed solution may be in a range of about 1.5 to about 2.5. The iron chloride hydrate may include $FeCl_3 \cdot 6H_2O$ and the germanate may include $Ge(OC_2H_5)_4$.

According to example embodiments of the present invention, since germanium components are incorporated into a structure of the iron oxyhydroxide, the iron oxyhydroxide may have improved structural ordering and stability.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on", "connected to" or "bonded to" another element or layer, it can be directly on, connected or bonded to the other element or layer or intervening elements or layers may be present. In contrast, when an element is referred to as being "directly on," "directly connected to" or "directly bonded to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Methods of Synthesizing Iron Oxyhydroxides

Methods of synthesizing iron oxyhydroxides in accordance with example embodiments of the present invention may produce the iron oxyhydroxides by hydrolysis and acidification of a mixed solution of iron chloride hydrate and germanate. For example, the iron oxyhydroxide may include akaganeite.

Figure 1:
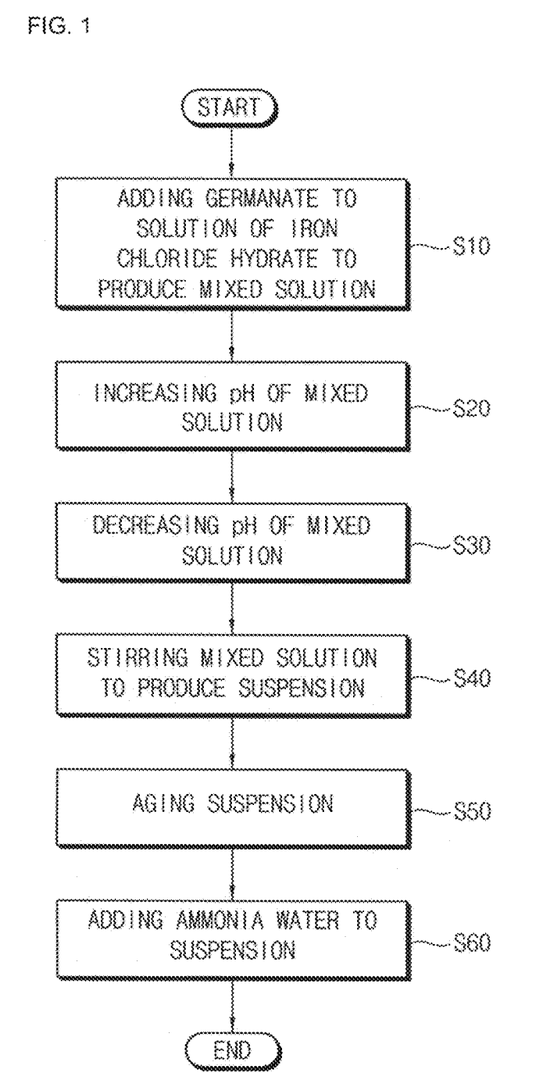
FIG. 1 is a flow-chart illustrating a method of producing iron oxyhydroxides.

FIG. 1 is a flow-chart illustrating a method of producing iron oxyhydroxide.

Referring to FIG. 1, in order to synthesize the iron oxyhydroxide, the germanate may be added to a solution of the iron chloride hydrate to produce a mixed solution of the iron chloride hyrate and the germanate (Step 10). In the example embodiments of the present invention, under stirring the solution of the iron chloride hydrate, the germanate may be dropwise added to the stirred solution of the iron chloride hydrate until a molar ratio of Fe/Ge reaches a predetermined value. After the molar ratio of Fe/Ge reaches the predetermined value, the mixed solution of the iron chloride hyrate and the germante may be left to stand for a predetermined time under stirring. The iron chloride hydrate may includes $FeCl_3 \cdot 6H_2O$ and the germanate may include Tetra-Ethyl-Ortho Germanate (TEOGe: $Ge(OC_2H_5)_4$). For example, TEOGe ($Ge(OC_2H_5)_4$) may be dropwise added to the stirred solution of 2 mM of $FeCl_3 \cdot 6H_2O$ until the molar ratio of Fe/Ge reaches the predetermined value. In the mixed solution of $FeCl_3 \cdot 6H_2O$ and TEOGe ($Ge(OC_2H_5)_4$), the molar ratio of Fe/Ge may be in a range of about 1.5 to about 2.5. The mixed solution of $FeCl_3 \cdot 6H_2O$ and TEOGe ($Ge(OC_2H_5)_4$) may be left to stand for about 30 minutes under vigorous stirring.

Then, pH of the mixed solutuoin may be increased to a first predetermined pH value (Step 20). In order to increase the pH of the mixed solution, a NaOH solution may be added to the mixed solution. For example, under stirring the mixed solution, 1M NaOH solution may be added to the mixed solution at a rate of about 0.5 ml/min until the pH of the mixed solution reaches the first predetermined pH value. The first predetermined pH value may be in a range of about 3 to about 15. The pH of the mixed solution which is not added by the NaOH solution may be about 2. The pH of the mixed solution may have an influence on a width and a length of the iron oxyhydroxide.

Then, pH of the mixed solution of which the pH has been increased to the first predetermined pH value may be decreased to a second predetermined pH value (Step 30). When the pH of the mixed solution reaches the second predetermined pH value, iron oxyhydroxide which is a product of the iron chloride hydrate and the germanate may be precipitated. The precipitated iron oxyhydroxide may be akaganeite having a structure which may incorporate germanium components. In example embodiments of the present invention, in order to decrease the pH of the mixed solution, 12N HCl solution may be dropwise added the mixed solution of which the pH has been increased to the first predetermined pH value. The HCl solution may be added to the mixed solution until the pH of the mixed solution reaches the second predetermined pH value which may be in a range of about 1 to about 2. For example, the HCl solution may be added to the mixed solution until the pH of the mixed solution reaches about 1.5. As adding the HCl solution, a color of the mixed solution may gradually become light yellow. In a conventional method of synthesizing a conventional akaganeite of which the structural ordering and stability is low, it is reported that the hematite ($\alpha\text{-}Fe_2O_3$) is favorably precipitated in the pH condition described above. However, in example embodiments of the present invention, since the germanium incorporated into the structure of the akaganeite improves the structural ordering and stability, the akaganeite may be precipitated in the pH condition described above.

Then, the mixed solution in which the product of the iron chloride and the germanate has been precipitated may be stirred to produce a suspension (Step 40). The suspension may be produced by stirring the mixed solution in which the product of the iron chloride and the germanate has been precipitated for about 1 hour at a room temperature.

Then, the suspension may be aged for a predetermined time at a height temperature (Step 50). During aging the suspension, crystalline nucleus of the iron oxyhydroxide which has been precipitated by decrease of the pH may grow. For example, the suspension may be aged in an oven for about 5 days at about 95° C. Then, ammonia water may be added to the aged suspension to flocculate the grown crystalline nucleuses of the iron oxyhydroxide (Step 60). The flocculated iron oxyhydroxide may be centrifuged. The added ammonia water may consume hydrogen ions in the aged suspension and may flocculate the grown crystalline nucleuses of the iron oxyhydroxide.

Iron Oxyhydroxides

Iron oxyhydroxides produced by the methods in accordance with example embodiments of the present invention described above may have improved structural ordering and stability.

The iron oxyhydroxide may include a plurality of iron hydroxide octahedra components which form a tunnel-type structure and a plurality of chloride components which are disposed in a tunnel of the tunnel-type structure. In example embodiments of the present invention, the iron oxyhydroxides may include akaganeite. The akaganeite may have a structure with 4 double chains of $FeO_3(OH)_3$ octahedra which form the tunnel and the tunnel may be partially occupied with chloride ions ($Cl^-$). The tunnel may extend along a direction of [101] and may have a diameter of about 0.5 nm.

In one example embodiment of the iron oxyhydroxides produced by the methods in accordance with example embodiments of the present invention, some of the chloride components disposed in the tunnel may be substituted with germanium components. For example, some of the chloride ions ($Cl^-$) may be substitute with germanium hydroxide components or germanium oxide components. The germanium hydroxide components may include 4 coordination form of $Ge(OH)_4^0$ and the germanium oxide components may include 4 coordination form of $GeO_4^{4-}$. The akaganeite including the germanium hydroxide components substituting for some of the chloride ions ($Cl^-$) may have a structural formula as following:

[Structural formula 1]

Figure 2:
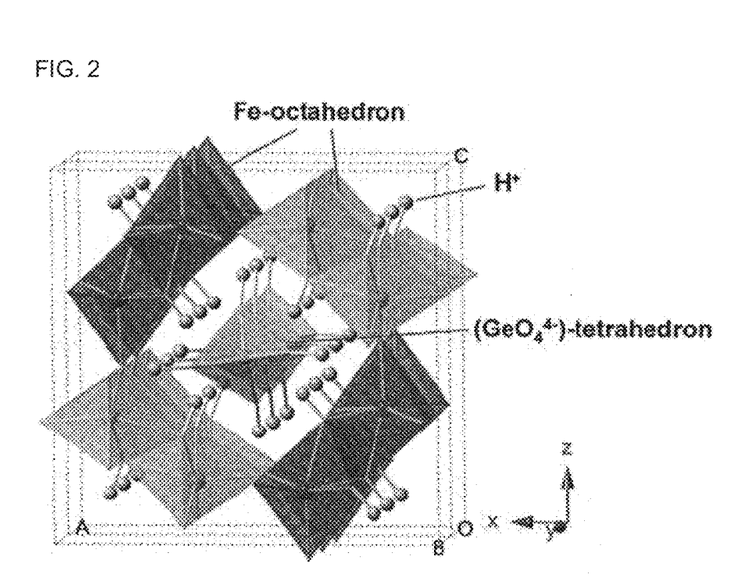
FIG. 2 is a view illustrating a structure of the akaganeite including the germanium oxide components substituting for some of the chloride ions ($Cl^-$)

The akaganeite including the germanium oxide components substituting for some of the chloride ions ($Cl^-$) may have a structural formula as following, and FIG. 2 show a structure of the akaganeite including the germanium oxide components substituting for some of the chloride ions ($Cl^-$).

[Structural formula 2]

In another example embodiments of the iron oxyhydroxides produced by the methods in accordance with example embodiments of the present invention, some iron components in the $FeO_3(OH)_3$ octahedra may be substituted with germanium components. For example, some of iron ions ($Fe^{3+}$) in the $FeO_3(OH)_3$ octahedra may be substituted with germanium ions ($Ge^{4+}$). The akaganeite including germanium ions ($Ge^{4+}$) substituting for some of the iron ions ($Fe^{3+}$) in the $FeO_3(OH)_3$ octahedra may have a structural formula as following:

[Structural formula 3]

In still another example embodiment of the iron oxyhydroxides produced by the methods in accordance with example embodiments of the present invention, some of the chloride components disposed in the tunnel and some iron components in the $FeO_3(OH)_3$ octahedra may be substituted with the germanium components. For example, some of the chloride ions ($Cl^-$) may be substituted with germanium hydroxide components or germanium oxide components and some of iron ions ($Fe^{3+}$) in the $FeO_3(OH)_3$ octahedra may be substituted with germanium ions ($Ge^{4+}$).

The iron oxyhydroxide in accordance with example embodiments of the present invention may have a rod-like shape in which the tunnel is formed. For example, the iron oxyhydroxide may have the rod-like shape with a width of about 15 nm to about 17 nm and a length of about 100 nm to about 200 nm. In the akaganeite in accordance with example embodiments of the present invention, an atomic ratio of the germanium (Ge) to the iron (Fe) may be in a range of about 0.12 to about 0.20, and an atomic ratio of the chloride (Cl) to the iron (Fe) may be in a range of about 0.04 to about 0.13. Compared with the conventional akaganeites, the akaganeites in accordance with example embodiments of the present invention may have improved structural ordering and stability.

<Synthesis of Akaganeite Incorporated by Germanium Components>

TEOGe ($Ge(OC_2H_5)_4$, 99.95 wt. %) was dropwise added to a stirred solution of 2 mM of $FeCl_3 \cdot 6H_2O$ until a molar ratio of Fe/Ge reached 2 and left to stand for 30 min under vigorous stirring. Then, 1 M NaOH solution was added at the rate of 0.5 ml/min under vigorous stirring until the pH of the solution reached 13, 10 and 5, respectively. A batch (pH≈2) with no addition of NaOH was also prepared. The pHs of the 4 batches were brought down immediately to 1.5 by dropwise addition of 12 N HCl. The resulting solutions were stirred for 1 hour at a room temperature to produce suspensions. The suspensions were then aged in an oven for 5 days at 95° C. The aged suspensions were flocculated by adding several drops of ammonia water and subsequently centrifuged. Pure akaganeite which had not been incorporated by germanium components was also prepared. Hereinafter, the akaganeites produced from the first batch (pH=13), the second batch (pH=10), the second batch (pH=5), and the fourth batch (pH≈2) will be referred to as 'Ge-Ak-1', 'Ge-Ak-2', 'Ge-Ak-3', and 'Ge-Ak-4', respectively, and the pure akaganiet will be referred to as 'Ak-ref'.

<TEM Images and Diffraction Results>

Transmission electron microscopy (TEM) images, high-resolution transmission electron microscopy (HRTEM) lattice fringe images and selected area electron diffraction (SAED) patterns were obtained with an omega-filter equipped transmission electron microscope.

Figure 3:
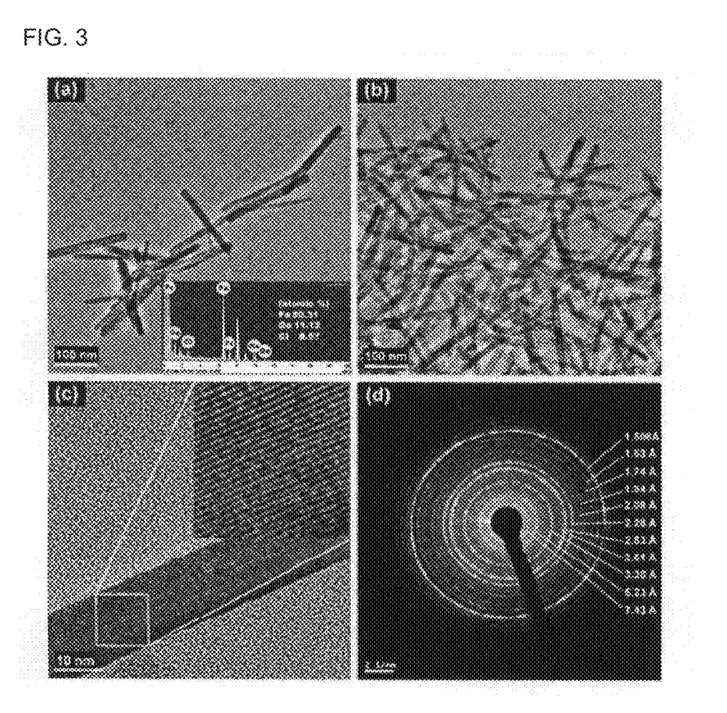
FIGS. 3A and 3D are transmission electron microscopy (TEM) images of Ge-Ak-1.

FIGS. 3A and 3B are TEM images of Ge-Ak-1, FIG. 3C is a HRTEM lattice fringe image of Ge-Ak-1, and FIG. 3D is SAED patterns of Ge-Ak-1.

FIGS. 3A and 3B show monodisperse nanorods with about 15-17 nm in width and about 200 nm in length, and FIG. 3C shows clearly visible lattice fringes. According to TEM-energy dispersive X-ray (EDX) analyses for Ge-Ak-1, the atomic ratio of Ge/Fe is about 0.14 and the atomic ratio of Cl/Fe is about 0.11. The atomic ratio of Ge/Fe indicates the successful incorporation of Ge into a structure of Ge-Ak-1. In Ak-ref, the atomic ratio Cl/Fe was about 0.25. Compared to the atomic ratio of Ak-ref, the atomic ratio of Cl/Fe is much lower than that of Ak-ref.

FIGS. 4A to 4H are TEM images of Ge-Ak-2, Ge-Ak-3, Ge-Ak-4, and Ak-ref.

Referring to FIGS. 4A to 4D, TEM images of Ge-Ak-2 and Ge-Ak-3 are similar to those of Ge-Ak-1. According to TEM-EDX analyses for Ge-Ak-2 and Ge-Ak-3, the atomic ratios of Ge/Fe are in a range of about 0.14 to about 0.18 and the ratios of Cl/Fe are in a range of about 0.06 to about 0.09. The atomic ratios of Ge/Fe indicate the successful incorporation of germanium into the structures of Ge-Ak-2 and Ge-Ak-3.

Figure 4:
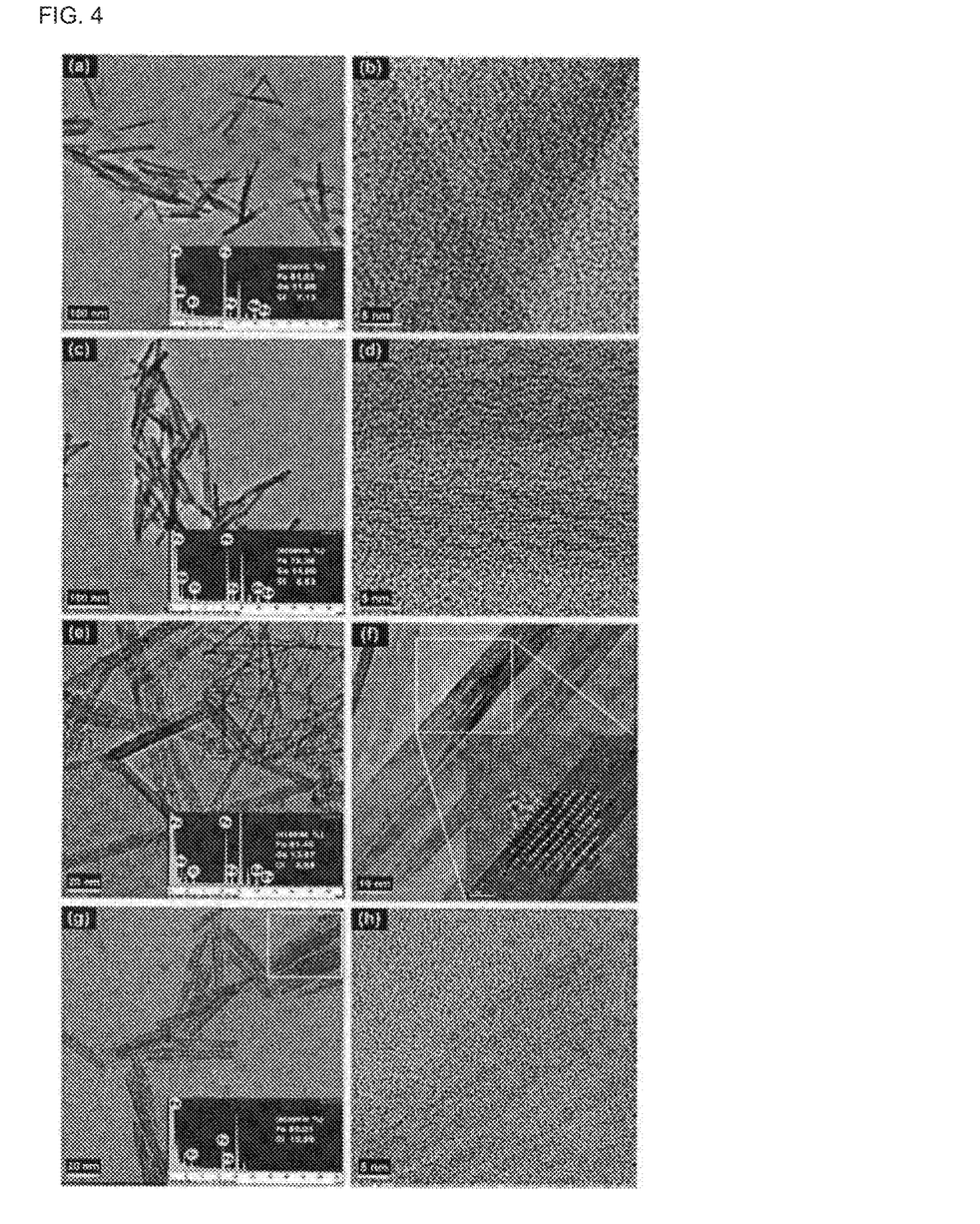
FIGS. 4A to 4H are transmission electron microscopy (TEM) images of Ge-Ak-2, Ge-Ak-3, Ge-Ak-4, and Ak-ref.

Referring to FIGS. 4E and 4F, TEM image of Ge-Ak-4 shows akaganeite nano-rods with >200 nm in length. This indicates that the specified pH conditions adjusted by NaOH-addition may have a role to play in controlling the length of the akaganeite nanorods.

Referring to FIGS. 4G and 4H, TEM images of Ak-ref show monodisperse nano-rods with about 10 nm in width and about 100 nm in length, but their shapes are not obviously compared with those of Ge-Ak-1, Ge-Ak-2 and Ge-Ak-3.

Figure 5:
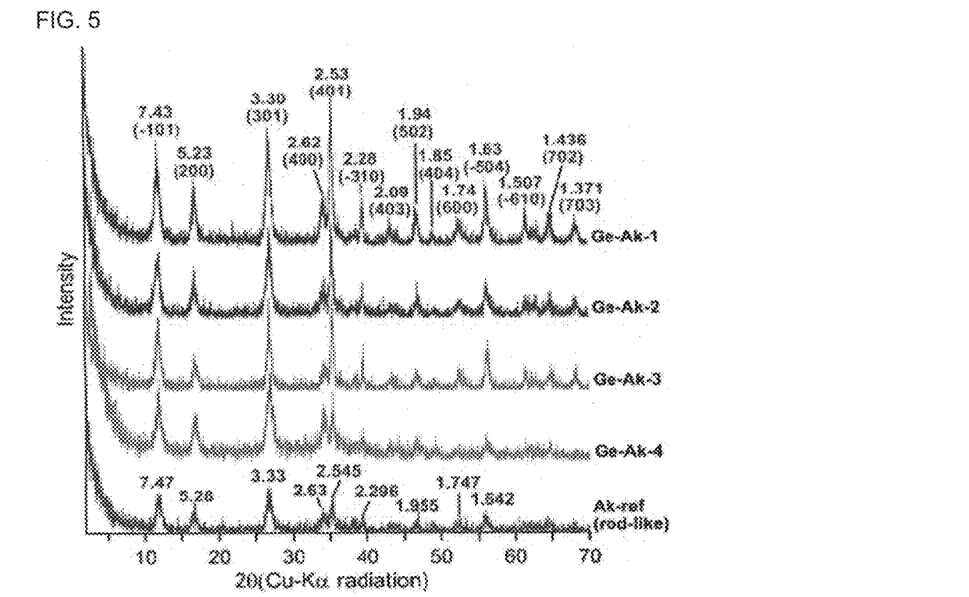
FIG. 5 is a graph illustrating X-ray diffraction (XRD) patterns of Ge-Ak-1, Ge-Ak-2, Ge-Ak-3, Ge-Ak-4, and Ak-ref.

FIG. 5 is a graph illustrating X-ray diffraction (XRD) patterns of Ge-Ak-1, Ge-Ak-2, Ge-Ak-3, Ge-Ak-4, and Ak-ref.

Referring to FIG. 5, d-spacings of Ge-Ak-1, Ge-Ak-2, Ge-Ak-3, and Ge-Ak-4 are consistent with that of Ge-Ak-1 but most reflections have been shifted relative to Ak-ref, and the peak intensities of Ge-Ak-1, Ge-Ak-2, Ge-Ak-3, and Ge-Ak-4 are much more distinct and stronger than that of Ak-ref. These indicate that an increase of structural ordering and a little change in the unit cell have occurred in Ge-Ak-1, Ge-Ak-2, Ge-Ak-3, and Ge-Ak-4. XRD patterns of Ge-Ak-2 and 3 are almost the same as that of Ge-Ak-1.

Figure 6:
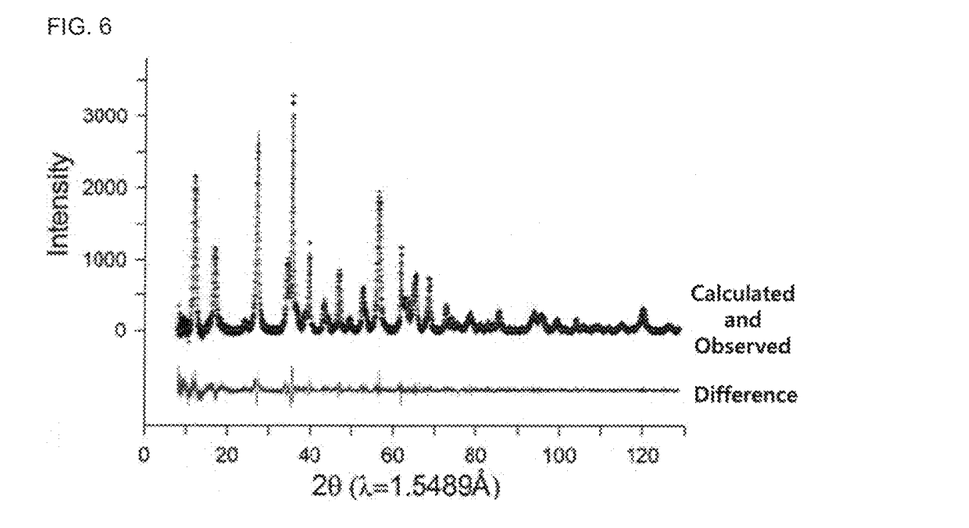
FIG. 6 is a graph illustrating profile-fitting between the observed and calculated profiles of Ge-Ak-1.

FIG. 6 is a graph illustrating profile-fitting between the observed and calculated profiles of Ge-Ak-1.

Figure 7:
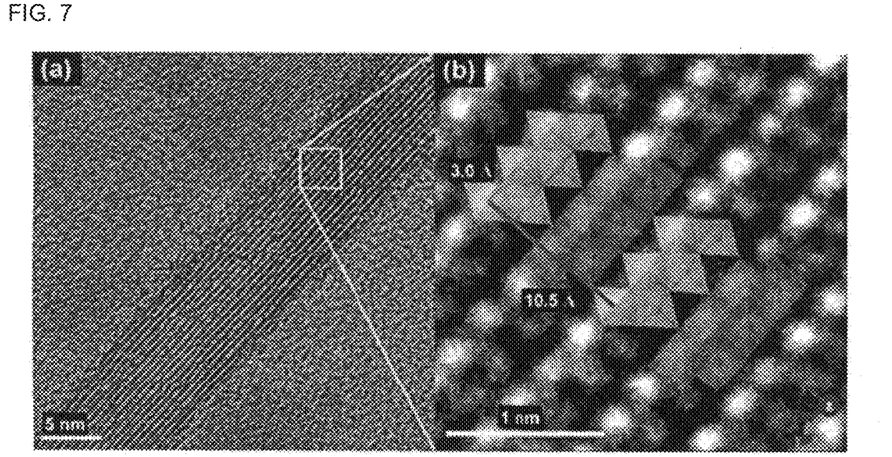
FIGS. 7A and 7B are high-resolution transmission electron microscopy (HRTEM) images of Ge-Ak-1.

Referring to FIG. 6, the profile-fitting refinement result of high-resolution synchrotron XRD data for Ge-Ak-1 is shown in FIG. 6. The refinement was performed on the basis of the monoclinic (/2/m) cell dimensions (a=10.5876(5) Å, b=3.03357(8) Å, c=10.5277(6) Å, β=90.14(2)°, V=338.13(2) Å$^3$) proposed by Post et al. (J. E. Post, P. J. Heaney, R. B. Von Dreele and J. C. Hanson, Am. Mineral., 2003, 88, 782) and the final refined parameters are summarized in Table 1.

eters directly measured from the HRTEM image are a=10.50 Å and b=3.02 Å, being in good agreement with the SAED and XRD results. The XRD results and HRTEM images strongly indicate that a distinct increase of structural ordering and a substantial decrease in the unit cell parameters happened because the germanium was incorporated into the akaganeite structure.

<Thermal Properties>

Figure 8:
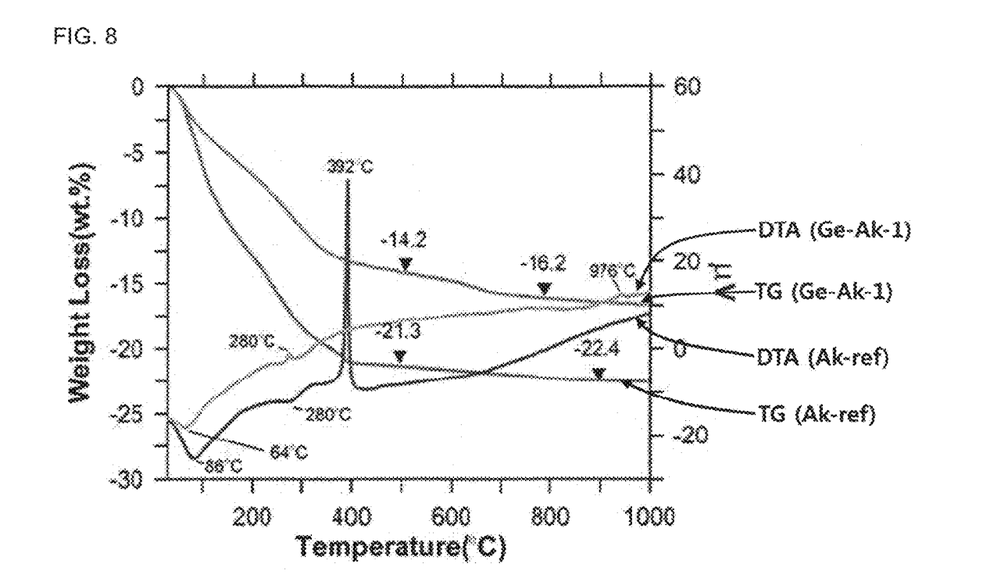
FIG. 8 is a graph illustrating thermal gravimetry (TG) and differential thermal analysis (DTA) results for Ge-Ak-1 and Ak-ref.

FIG. 8 is a graph illustrating thermal gravimetry (TG) and differential thermal analysis (DTA) results for Ge-Ak-1 and Ak-ref.

Referring to FIG. 8, the TG result of Ge-Ak-1 shows that the substantial weight loss occurs under 400° C. The weight loss of Ge-Ak-1 under 400° C. is about 14 wt. %. The weight loss of Ge-Ak-1 gradually slows over 400° C. and reaches about 16.2 wt. % at 800° C. The weight loss of Ak-ref is about 22.4 wt. % at 800° C. The weight loss of Ge-Ak-1 is much smaller than that of Ak-ref.

The DTA result of Ge-Ak-1 shows a distinct endothermic peak at 64° C. and two weak exothermic peaks at 280° C. and 945° C., which would be related to the phase transformation. Whereas the DTA result of Ak-ref shows two endothermic peaks at 86° C. and 280° C., and an exothermic peak at 392° C., indicating the phase transformation to hematite.

Figure 9:
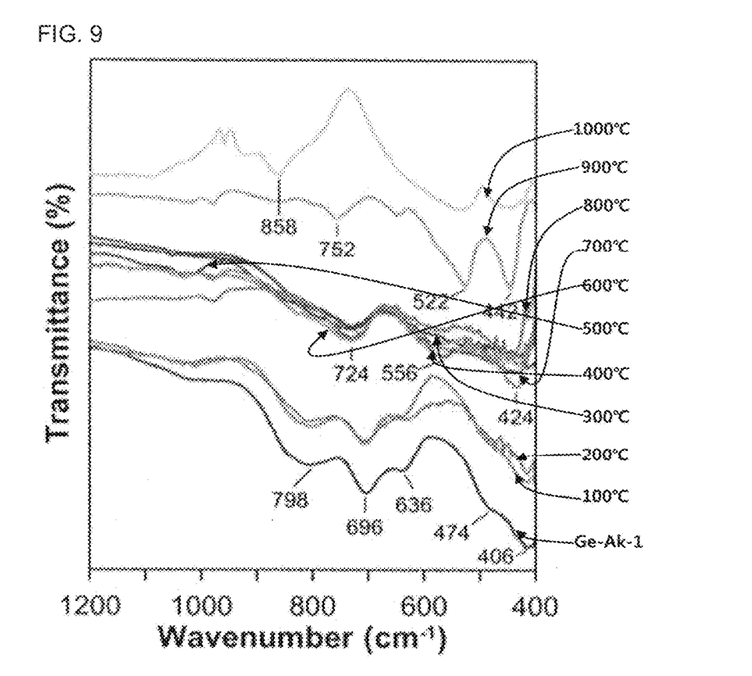
FIG. 9 is a graph illustrating FT-IR analysis of Ge-Ak-1.

FIG. 9 is a graph illustrating FT-IR analysis of Ge-Ak-1.

Phase transformation of the Ge-Ak-1 is confirmed by FT-IR analysis in FIG. 9. Ge-Ak-1 shows distinct spectra at 406 cm$^{-1}$, 474 cm$^{-1}$, 636 cm$^{-1}$, 696 cm$^{-1}$, and 798 cm$^{-1}$. After Ge-Ak-1 is heated to 300° C., distinct spectra at 424 cm$^{-1}$, 556 cm$^{-1}$, and 724 cm$^{-1}$ are observed, indicating the formation of Ge incorporated ferrihydrite. It is well matched with a weak exothermic peak at 280° C. shown in FIG. 8. Transformation of the ferrihydrite to hematite occurs at about 900° C., which is confirmed by two distinct spectra of hematite at 442 cm$^{-1}$ and 522 cm$^{-1}$ in the 900° C. heated sample. It indicates strongly that Ge-incorporation should play a crucial role in stabilizing the akaganeite structure.

<Magnetic Properties>

Figure 10:
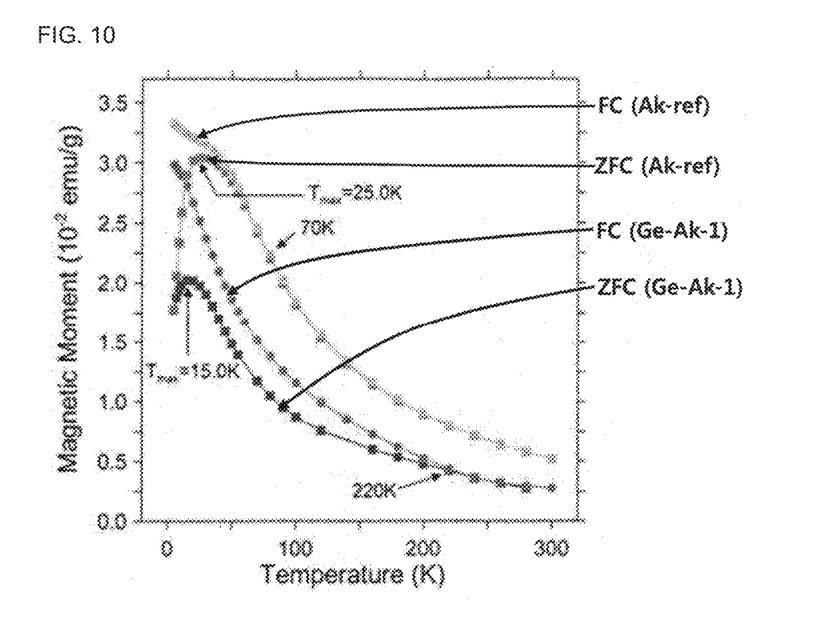
FIG. 10 is a graph illustrating zero-field-cooled (ZFC) and field-cooled (FC) susceptibility curves of Ge-Ak-1 and Ak-ref.

FIG. 10 is a graph illustrating zero-field-cooled (ZFC) and field-cooled (FC) susceptibility curves of Ge-Ak-1 and Ak-ref.

Referring to FIG. 10, Ge-Ak-1 and Ak-ref show superparamagnetic behavior. As Ge-Ak-1 and Ak-ref are cooled in zero applied field (ZFC), the magnetic spins are frozen randomly. With increasing temperature and in the presence of an applied field, the spins begin to align, leading to an increase in the total magnetization to a maximum at the blocking temperature ($T_B$), where the thermal fluctuations randomize the spins, and a superparamagnetic behavior results.

TABLE 1

| Sample | Space group | a (Å) | b (Å) | c (Å) | β (°) | V (Å$^3$) | No. of data points | wRp | Rp |
|---|---|---|---|---|---|---|---|---|---|
| Ge-Akaganeite | I2/m | 10.5050(8) | 3.0177(1) | 10.4429(7) | 90.360(4) | 333.05(4) | 5937 | 0.0531 | 0.0403 |
| Pure Akaganeite | I2/m | 10.5876(5) | 3.03357(8) | 10.5277(6) | 90.14(2) | 338.13(2) | 2876 | 0.019 | 0.016 |

Results of profile-fitting refinement show the monoclinic (/2/m) cell dimensions with a=10.5050(8) Å, b=3.0177(1) Å, c=10.4429(7) Å, β=90.360(7)°, and V=331.05(4) Å$^3$ which are distinctly shorter than those obtained by Post et al.

FIGS. 7A and 7B are HRTEM images of Ge-Ak-1.

FIGS. 7A and 7B shows a highly ordered akaganeite nano-rod elongated to the b-axis in the ab-plane. Unit cell param- As Ge-Ak-1 and Ak-ref are cooled in the applied field (FC), the spins are locked in a parallel alignment, then the magnetization remains relatively unchanged below $T_B$. With increasing temperature, ZFC and FC curves merge. The presence of a maximum ($T_{max}$) in the ZFC susceptibility curve, which is related to the blocking temperature ($T_B$), is associated with the transition between magnetically relaxing superparamagnetic (unblocked) and thermally stable magnetization (blocked), that is, the magnetic domain structure. The ZFC curve of Ge-Ak-1 is characterized by the lower magnetic moment and $T_{max}$ (15.5 K) than those of Ak-ref (25.0 K). The relatively low $T_B$ of Ge-Ak-1 would be attributed to the reduction in the average domain size by Ge-incorporation into the akaganeite structure. The convergence temperature of ZFC and FC curves can be assigned to $T_B$ of the largest domain. The ZFC and FC curves of Ge-Ak-1 are observed to converge abnormally at 220 K, and the ZFC and FC curves of Ak-ref are observed to converge abnormally at 70 K. The convergence temperature of ZFC and FC curves of Ge-Ak-1 is much higher than that of Ak-ref. It may be due to the differences in domain size.

Figure 11:
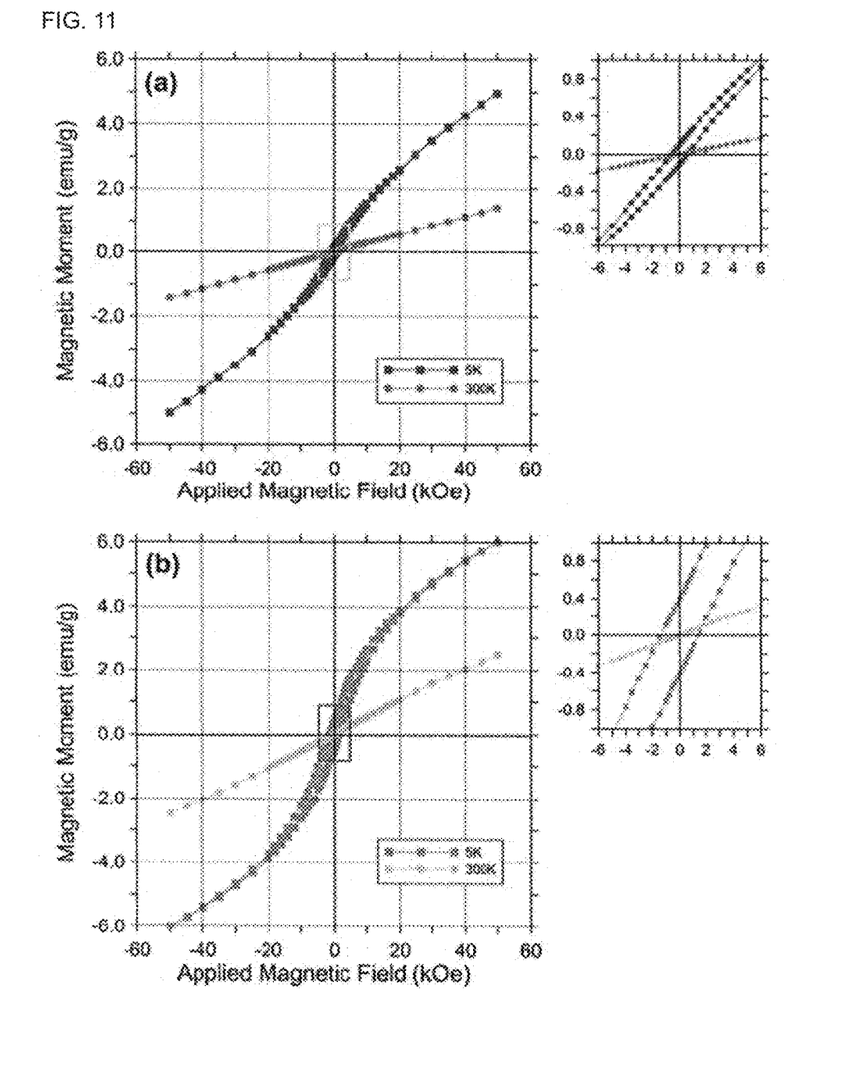
FIGS. 11A and 11B are graphs illustrating hysteresis loops of Ge-Ak-1 and Ak-ref.

FIGS. 11A and 11B are graphs illustrating hysteresis loops of Ge-Ak-1 and Ak-ref.

Referring to FIGS. 11A and 11b, the magnetic moment of Ge-Ak-1 is a little lower than that of Ak-ref, indicating structural effects due to the Ge-incorporation into the akaganeite structure.

According to example embodiments of the present invention, since the germanium (Ge) is incorporated into the structure of the iron oxyhydroxide having a tunnel-type structure, the iron oxyhydroxide may have improved structural ordering and stability. Therefore, the iron oxyhydroxide may be used as the catalyst or the absorbent for the nano-technical application.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An iron oxyhydroxide comprising
   a plurality of iron hydroxide octahedra components which form a tunnel-type structure;
   a plurality of chloride components which are disposed in a tunnel of the tunnel-type structure and bonded to at least one of the iron hydroxide octahedra components; and
   at least one of germanium hydroxide components or germanium oxide components substituting for at least one of the chloride components.

2. The iron oxyhydroxide of claim 1, further comprising at least one germanium ion substitutes for at least one of iron ions in the iron hydroxide octahedra components.

3. The iron oxyhydroxide of claim 1, wherein an atomic ratio of germanium to iron is in a range of about 0.12 to about 0.20 and an atomic ratio of chloride to the iron is in a range of about 0.04 to about 0.13.

4. The iron oxyhydroxide of claim 1, wherein the iron oxyhydroxide comprises akaganeite.

5. The iron oxyhydroxide of claim 1, wherein the akaganeite has a tunnel typed rod-like shape with a width of about 15 nm to about 17 nm and a length of about 100 nm to about 200 nm.

6. A method of synthesizing an iron oxyhydroxide comprising:
   adding germanate to a solution of iron chloride hydrate to produce a mixed solution;
   increasing pH of the mixed solution; and
   decreasing the increased pH of the mixed solution to precipitate products of the iron chloride hydrate and the germanate.

7. The method of claim 6, further comprising:
   stirring the mixed solution having the precipitated products to produce a suspension; aging the suspension to grow the precipitated products; adding ammonia water to the aged suspension to flocculate the grown products.

8. The method of claim 6, wherein a molar ratio of iron to germanium in the mixed solution is in a range of about 1.5 to about 2.5.

9. The method of claim 6, wherein the iron chloride hydrate comprises $FeCl_3 \cdot 6H_2O$ and the germanate comprises $Ge(OC_2H_5)_4$.

* * * * *